US012566285B2

(12) United States Patent
Drammeh et al.

(10) Patent No.: US 12,566,285 B2
(45) Date of Patent: Mar. 3, 2026

(54) METHOD AND APPARATUS FOR MICROSTRUCTURED FILTERS IN LAMINATES FOR LIGHT ATTENUATION

(71) Applicant: Essilor International, Charenton-le-Pont (FR)

(72) Inventors: Ahmed Drammeh, Dallas, TX (US); Zbigniew Tokarski, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 643 days.

(21) Appl. No.: 17/918,212

(22) PCT Filed: Apr. 13, 2021

(86) PCT No.: PCT/EP2021/059569
§ 371 (c)(1),
(2) Date: Oct. 11, 2022

(87) PCT Pub. No.: WO2021/209451
PCT Pub. Date: Oct. 21, 2021

(65) Prior Publication Data
US 2023/0146101 A1 May 11, 2023

(30) Foreign Application Priority Data
Apr. 14, 2020 (EP) .................................... 20315167

(51) Int. Cl.
*G02B 5/18* (2006.01)
*B29D 11/00* (2006.01)
(Continued)

(52) U.S. Cl.
CPC ...... *G02B 5/1814* (2013.01); *B29D 11/00355* (2013.01); *B29D 11/0073* (2013.01);
(Continued)

(58) Field of Classification Search
None
See application file for complete search history.

(56) References Cited

U.S. PATENT DOCUMENTS 8,482,857 B2 7/2013 Wolterink et al.
10,386,654 B2 8/2019 Marshall et al.
(Continued)

FOREIGN PATENT DOCUMENTS

EP 1887414 2/2008
EP 3220190 9/2017
(Continued)

OTHER PUBLICATIONS

International Search Report and Written Opinion issued in Corresponding PCT Application No. PCT/EP2021/059571, dated May 11, 2021.
(Continued)

*Primary Examiner* — Richard H Kim
(74) *Attorney, Agent, or Firm* — Norton Rose Fulbright US LLP

(57) ABSTRACT

A laminate, includes: a first layer, a first material of the first layer having a first refractive index, the first layer including a first surface; a first microstructure layer including a first microstructure pattern formed on a first surface of the microstructure layer, a first microstructure material of the first microstructure layer having a first microstructure material refractive index, the first microstructure pattern having first repeating structures with a first predetermined periodicity, the microstructure layer being disposed on the first surface of the first layer; a second layer, a second material of the second layer having a second refractive index, the second layer being disposed adjacent to the first surface of the first microstructure layer; and a third layer, a third material of the third layer having a third refractive index, the
(Continued)

third layer being disposed adjacent to the second layer on a side opposite the microstructure layer.

13 Claims, 10 Drawing Sheets

(51) Int. Cl.

| | |
|---|---|
| *B33Y 10/00* | (2015.01) |
| *B33Y 80/00* | (2015.01) |
| *G02B 5/28* | (2006.01) |
| *G02C 7/02* | (2006.01) |
| *G02C 7/10* | (2006.01) |

(52) U.S. Cl.
CPC ........... *G02B 5/1857* (2013.01); *G02B 5/285* (2013.01); *G02C 7/022* (2013.01); *G02C 7/107* (2013.01); *B33Y 10/00* (2014.12); *B33Y 80/00* (2014.12); *G02C 2202/16* (2013.01)

(56) References Cited

U.S. PATENT DOCUMENTS

| | | | | |
|---|---|---|---|---|
| 2006/0006336 | A1 | 1/2006 | Cano et al. | |
| 2008/0030675 | A1* | 2/2008 | Dillon | G02C 7/021 |
| | | | | 351/159.62 |
| 2008/0212193 | A1 | 9/2008 | Steenblik et al. | |
| 2009/0153970 | A1 | 6/2009 | Lee et al. | |
| 2010/0177380 | A1 | 7/2010 | Nagahama et al. | |
| 2012/0057100 | A1 | 3/2012 | Masuda et al. | |
| 2013/0052294 | A1 | 2/2013 | Wang et al. | |
| 2014/0087140 | A1 | 3/2014 | Benson | |
| 2015/0251480 | A1 | 9/2015 | Souparis et al. | |
| 2016/0003992 | A1 | 1/2016 | Nagahama et al. | |
| 2016/0306192 | A1 | 10/2016 | Marshall et al. | |
| 2017/0131567 | A1 | 5/2017 | To et al. | |
| 2017/0299898 | A1 | 10/2017 | Gallina et al. | |
| 2017/0368569 | A9* | 12/2017 | Wolk | B29D 11/0073 |
| 2020/0073147 | A1 | 3/2020 | Bakaraju et al. | |
| 2022/0357595 | A1 | 11/2022 | Guillot et al. | |
| 2023/0148025 | A1 | 5/2023 | Jallouli et al. | |

FOREIGN PATENT DOCUMENTS

| | | |
|---|---|---|
| WO | WO 2010/135213 | 11/2010 |
| WO | WO 2012/067761 | 5/2012 |
| WO | WO 2016/168746 | 10/2016 |
| WO | WO 2018/076057 | 5/2018 |
| WO | WO 2021/090207 | 5/2021 |

OTHER PUBLICATIONS

International Search Report and Written Opinion issued in Corresponding PCT Application No. PCT/EP2021/059569, dated Jul. 2, 2021.

International Search Report and Written Opinion issued in Corresponding PCT Application No. PCT/EP2021/059582, dated May 12, 2021.

"All You Should Know About Thermoplastic Materials", pp. 1-3, 2019, [online], [retrieved Apr. 2, 2025], retrieved from the Internet <URL: https://protoplastics.com/about-thermoplastic-materials/>.

"High-performance Micro-optic Components", pp. 1-4, 2017, [online], [retrieved Apr. 1, 2025], retrieved from the Internet URL:https://www.teledynesi.com/en-us/Products-and_Services_/Documents/Optical%20Microlenses/2017/Microlens-Brochure-3%20FINAL.pdf.

"Refractive Index for Some Common Liquids, Solids and Gases", pp. 1-5, 2017, [online], [retrieved Apr. 2, 2025], retrieved from the Internet <URL: https://web.archive.org/web/20170609085907/https://www.engineeringtoolbox.com/refractive-index-d_1264.html>.

Jacques et al., "Micro Lens Array Assembly for Optical Organic Substrate", *2019 IEEE 69th Electronic Components and Technology Conference (ECTC)*, pp. 1074-1080, 2019.

* cited by examiner

*100*

*105*

*130*

METHOD AND APPARATUS FOR MICROSTRUCTURED FILTERS IN LAMINATES FOR LIGHT ATTENUATION

CROSS-REFERENCE TO RELATED APPLICATIONS

This application is a national phase application under 35 U.S.C. § 371 of International Application No. PCT/EP2021/059569 filed 13 Apr. 2021, which claims priority to European Patent Application No. 20315167.5 filed 14 Apr. 2020. The entire contents of each of the above-referenced disclosures is specifically incorporated by reference herein without disclaimer.

FIELD OF THE INVENTION

The present disclosure relates to light-management of optical films as it applies to microstructures in applications dealing with antireflective surfaces and other visual impairments, and methods of forming the microstructures on the surface of films or within laminate structures.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Functional optical films and/or laminates can be shaped (formed) and over-molded into lenses for photochromic, polarizer, or other functional applications. This includes methods to fabricate laminate constructions, shape the laminate into a curved wafer, and thermoplastic injection molding or thermoset cast molding to form lenses for health or light management applications. They can also be shaped and adhered or bonded to an already formed lens.

Notably, the multilayered laminate structure can include a layer having a microstructure pattern capable of attenuating incident light. Even further, the microstructure pattern can be designed to attenuate multiple ranges of wavelengths of light to address visual health issues such as, but not limited to, migraines, vertigo, and sleep deprivation caused by photosensitivity and photophobia. By designing microstructures with predetermined patterns, the target ranges of wavelengths of light can be depressively reflected and/or diverted to prevent said harmful, undesired wavelength from reaching a viewer and causing the aforementioned unwanted light-induced health issues. Thus, a laminate structure having these microstructure patterns and methods of forming said laminates is desired for incorporation into ophthalmic lenses.

SUMMARY

According to the claims, the present disclosure relates to a laminate including: a first layer, a first material of the first layer having a first refractive index, the first layer including a first surface; a first microstructure layer including a first microstructure pattern formed on a first surface of the microstructure layer, a first microstructure material of the first microstructure layer having a first microstructure material refractive index, the first microstructure pattern having first repeating structures with a first predetermined periodicity, the microstructure layer being disposed on the first surface of the first layer; a second layer, a second material of the second layer having a second refractive index, the second layer being disposed adjacent to the first surface of the first microstructure layer; and a third layer, a third material of the third layer having a third refractive index, the third layer being disposed adjacent to the second layer on a side opposite the microstructure layer.

According to the claims, the disclosure additionally relates to method of forming a laminate, including: forming a first microstructure pattern on a first surface of a first layer, the first layer having a first material with a first refractive index, the first microstructure pattern having first repeating structures with a first predetermined periodicity; laminating a second layer to the first layer, the second layer having a second material with a second refractive index, the second layer being disposed adjacent to the first surface of the first layer; and laminating a third layer having a third material with a third refractive index to the second layer.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1A:
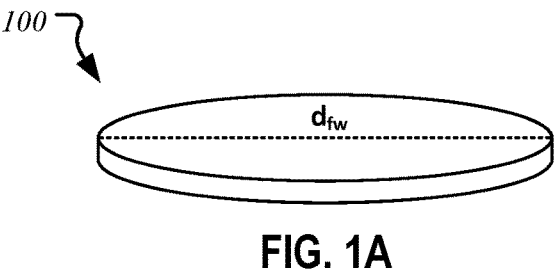
FIG. 1A is a schematic of a flat laminate wafer, according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

An optical narrow notch filter provides absorption or rejection over a narrow selected bandwidth of wavelengths and allows for a maximum overall transmission outside of this rejected bandwidth. Optical notch filters with these properties have a basic multiplane or multilayer configuration. They selectively reject a wavelength band (or frequency band (Hz=1/wavelength)) by a diffraction or interference phenomenon. These filters can be classified as, for example, holographic (with planes of diffraction), dielectric or polymeric multilayers (with planes of interference), liquid crystals (with planes of crystallization), Rugates (with planes of diffraction), etc. For example, holographic structures can be created by producing a constructive interference pattern of two or more intersecting monochromatic laser beams on a sensitized flat film, such as a Dichromated Gelatin (DCG) film. These filters can be formed using micro-nano embossing or imprinting technology.

Techniques herein provide methods and apparatuses for microstructured filters in multilayered laminate structures for ophthalmic lenses. The laminate structures can include polymeric microstructured patterns on a surface of one of the layers.

FIG. 1A is a schematic of a flat laminate wafer 100, according to an embodiment of the present disclosure. FIG. 1A shows diameters and base curves of various components involved in cutting, thermoforming, and molding. In an embodiment, a diameter, $d_{fw}$, of a circular flat wafer is the same length as an arc length of the flat laminate wafer 100 after thermoforming.

Figure 1B:
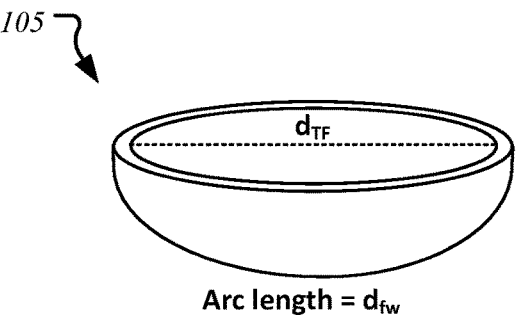
FIG. 1B is a schematic of a thermoformed laminate wafer, according to an embodiment of the present disclosure.

FIG. 1B is a schematic of a thermoformed laminate wafer 105, according to an embodiment of the present disclosure. In an embodiment, a cord length, $d_{TF}$, of the thermoformed laminate wafer 105 can be approximately the same diameter as a diameter of the lens.

Figure 1C:
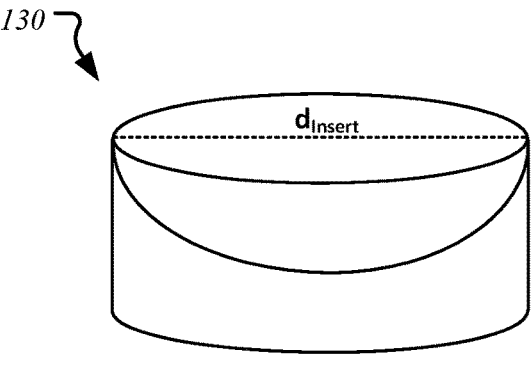
FIG. 1C is a schematic of a concave mold insert, according to an embodiment of the present disclosure.

FIG. 1C is a schematic of a concave mold insert 130, according to an embodiment of the present disclosure. In an embodiment, the diameter of the lens can be determined by, for example, a diameter, $d_{insert}$, of the concave mold insert 130. Thus, both the chord length ($d_{TF}$) and the concave mold insert 130 diameter ($d_{insert}$) can be smaller in diameter than the diameter ($d_{fw}$) of the flat laminate wafer 100. The arc length of the concave mold insert 130 is equal to or greater than the arc length of the thermoformed laminate wafer 105 due to the differences in the base curves of the flat laminate wafer 100 and the concave mold insert 130.

Figure 1D:
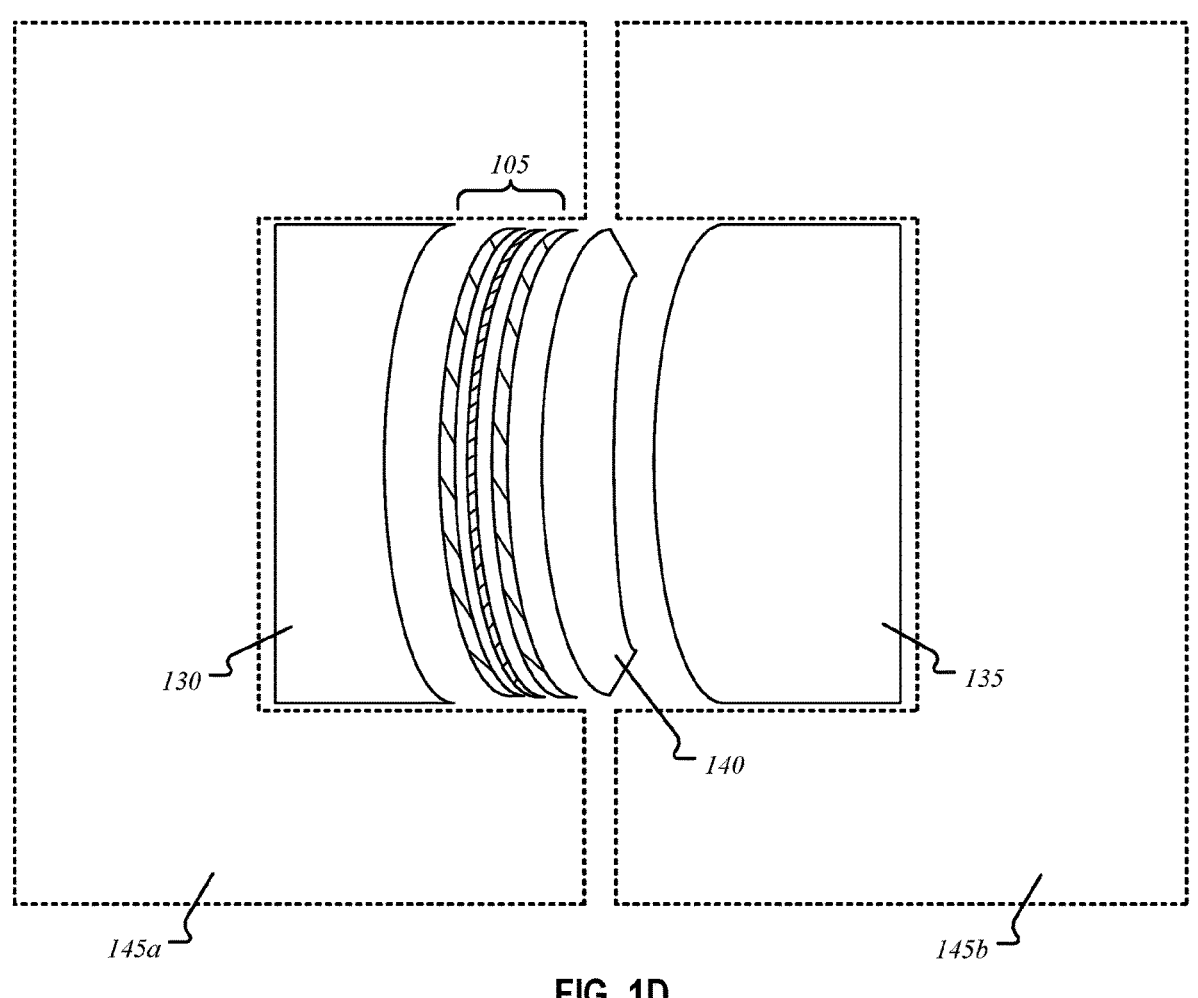
FIG. 1D is a schematic of a molding device, according to an embodiment of the present disclosure.

FIG. 1D is a schematic of a molding device, according to an embodiment of the present disclosure. In an embodiment, the molding device can include a first mold side 145a, a second mold side 145b, the concave mold insert 130, and a convex mold insert 135. The first mold side 145a and the second mold side 145b can each include a hollow portion, wherein the concave mold insert 130 and the convex mold insert 135 can be removeably disposed therein. As shown in FIG. 1D, the first mold side 145a including the concave mold insert 130 can be configured to couple with the second mold side 145b including the convex mold insert 135. Upon coupling, the concave mold insert 130 and the convex mold insert 135 can form a cavity connected to a hollow line formed by the coupling of the first and second mold sides 145a, 145b. The line can be configured to receive a polymer, for example, via a screw feeder or similar device. The cavity can be configured to receive the thermoformed laminate wafer 105. A curvature of the concave mold insert 130 and a curvature of the convex mold insert 135 can determine a lens power of the resulting lens. For a semi-finished lens, a curvature along a convex side of the lens is fixed and the concave side of the lens can be modified after molding, for example via grinding and polishing. Note that multiple lines for receiving the polymer can be connected, such that an injection of the polymer from a source can fill multiple mold devices with a single injection and allow for parallel fabrication of multiple lenses. The polymer can be, for example, a polymer melt 140. The injected polymer melt 140 can be of a thermoplastic nature using a thermally assisted screw via an injection molding process, or of a thermosetting nature using a plunger or a plug assisted device to feed a monomer at temperatures slightly higher than ambient conditions into a casting mold and then cured at elevated temperatures.

Figure 1E:
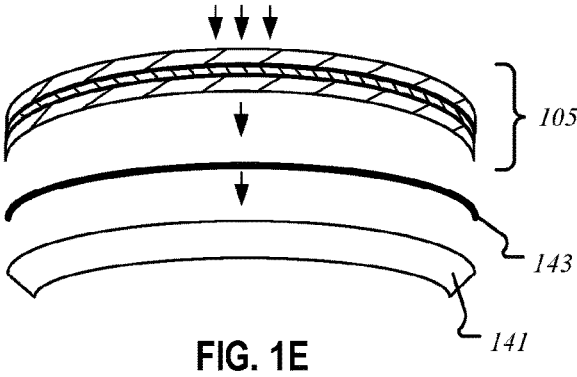
FIG. 1E is a schematic of adhering or bonding a thermoformed laminate wafer to a lens, according to an embodiment of the present disclosure.

FIG. 1E is a schematic of adhering or bonding the thermoformed laminate wafer 105 to a lens 141, according to an embodiment of the present disclosure. In an embodiment, a bonding material 143 can be applied between a convex side of the lens and a concave side of the thermoformed laminate wafer 105 to attach the thermoformed laminate wafer 105 to the lens 141. The bonding material 143 can be, for example, an adhesive. Although the above example shows a possible configuration for a front-side wafer lamination process onto the lens 141, other configurations can be contemplated, for example wherein the thermoformed wafer laminate 105 can also be adhered to the concave side (the back-side) of the lens 141 using the bonding material 143 to have the laminate wafer on the finished side of the lens 141 that is closest to the wearer's eye.

Prior to placement in the molding device or attachment to the lens 141, the flat laminate wafer 100 can be thermoformed into the curved shape of the thermoformed laminate wafer 105, for example via a thermoforming machine. It may be appreciated that known devices and methods can be used to thermoform the flat laminate wafer 100, for example a LEMA™ of Italy machine that incrementally increases the curvature of the flat laminate wafer 100 under applied heat. During thermoforming, the flat laminate wafer 100 can be placed onto a heated thermoforming insert, and a vacuum assisted force can be applied to secure the flat laminate wafer 100 to the thermoforming insert. By adjusting a temperature of the applied heat, a duration of the heat, and a force of the applied vacuum, the flat laminate wafer 100 can be formed to the curved shape of the thermoforming insert to produce the thermoformed laminate wafer 105.

In an embodiment, the flat laminate wafer 100 can include a first layer 110, a second layer 120, a third layer 125, and a first microstructure pattern 115 disposed between the first layer 110 and the second layer 120. The first layer 110 can include a first material having a first refractive index. The second layer 120 can include a second material having a second refractive index. The third layer 125 can include a third material having a third refractive index. The first microstructure pattern 115 can include a first microstructure material having a first microstructure material refractive index. Thermoforming the flat laminate wafer 100 can produce a curved structure with the first layer 110 being the concave side and the third layer 125 being a convex side. The first microstructure pattern 115 can be formed via myriad techniques described herein. The first microstructure pattern 115 can be, for example, a grating (with cross-sections including triangular, rectangular, rounded, pointed, etc.), pillars, depressions (i.e. holes), raised islands (e.g. dome-like mounds, pyramidal mounds, etc.), or any combination thereof. In one example, the structures on the grating can have a width $W_1$. The structures can repeat with a periodicity, the periodicity based on a distance between each repeating structure and the width $W_1$.

Figure 2A:
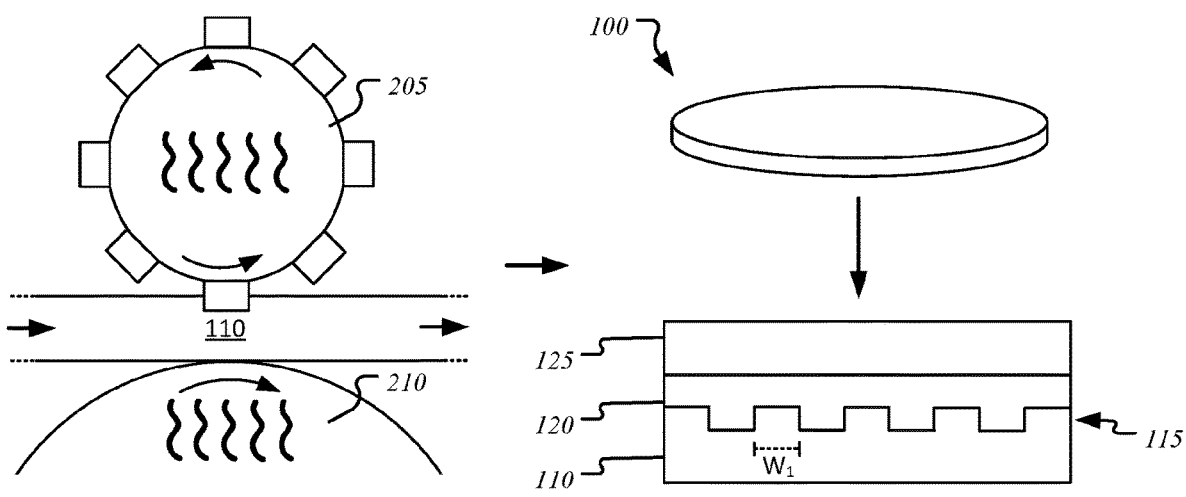
FIG. 2A is a schematic of a roll-to-roll fabrication process, according to an embodiment of the present disclosure.

FIG. 2A is a schematic of a roll-to-roll fabrication process, according to an embodiment of the present disclosure. In an embodiment, the first microstructure pattern 115 can be formed via the roll-to-roll fabrication process, wherein a film of the first layer 110 can be rolled through a pair of rollers including a first roller 205 and a second roller 210. In one example, the first microstructure pattern 115 can be a grating with a rectangular cross-section and the first roller 205 can include a textured surface having rectangular protrusions extending along a length of the first roller 205 (i.e. orthogonal to the cross-section of the first roller 205). As the first layer 110 rolls through the first roller 205 and the second roller 210, heat can be applied. For example, both the first roller 205 and the second roller 210 can be heated. The heat can raise the temperature of the first layer 110 to a predetermined temperature, wherein the predetermined temperature is above the glass transition temperature (Tg) of the first material of the first layer. It may be appreciated that the film of the first layer 110 can be optionally pre-heated before imprinting to ensure the temperature of the first material is above the $T_g$ of the first material. Heating the first material above the $T_g$ of the first material can cause the first material to become viscous and flow, wherein the first material can be a polymer. By becoming viscous, the surface of the first layer 110 can become amorphous and adopt the shape of the textured surface of the first roller 205. As the first layer 110 rolls through the first roller 205 and the second roller 210 above the $T_g$ of the first material, the rectangular, or other shaped, protrusions of the textured surface of the first roller 205 can imprint into a first surface of the first layer 110, thereby forming the first microstructure pattern 115. In this example, the first material and the first microstructure material are the same since the first microstructure pattern is formed into the first surface of the first layer 110. After the first layer 110 is imprinted, the imprinted first layer 110 can be cooled to below the $T_g$ of the first material to solidify the first microstructure pattern 115. The second layer 120 can be applied on top of the first layer 110 in order to fill in-between voids of the first microstructure pattern 115. For example, the second layer 120 can be an adhesive. The third layer 125 can subsequently be applied on top of the second layer 120 to encapsulate the first microstructure pattern 115 between the first layer 110 and the third layer 125. For the second layer 120 being an adhesive, the third layer 125 can be laminated over the second layer 120 to adhere the third layer 125 to the first layer 110 for instance.

In another example, a flexible textured film having the rectangular protrusions can be rolled along the surface of the first roller 205 to imprint the first microstructure 115. This can enable a more intricate pattern having a longer periodicity to be imprinted into the first layer 110. Similarly, a larger bore first roller 205 can be used. However, an advantage of the textured film can include modularity, wherein a new textured film sleeve having a new pattern can be switched in and out of the first roller 205 when desired instead of switching out an entire textured roller.

Figure 2B:
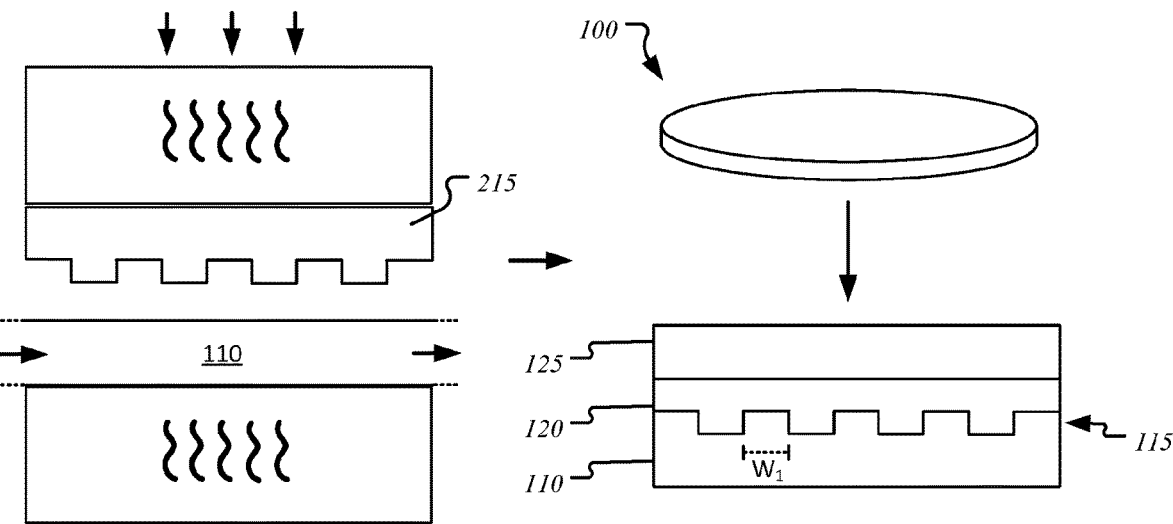
FIG. 2B is a schematic of a thermal-assisted roll-to-plate fabrication process, according to an embodiment of the present disclosure.

FIG. 2B is a schematic of a thermal-assisted roll-to-plate fabrication process, according to an embodiment of the present disclosure. This can also be known as a roll-to-stamp fabrication process. In an embodiment, the first microstructure can be formed via the roll-to-plate fabrication process, wherein the film of the first layer 110 can be transported along a production line and a first planar mold 215 can imprint into the first surface of the first layer 110. In one example, the first planar mold 215 can include a negative impression of the first microstructure pattern 115 such that when the first planar mold 215 is imprinted into the first surface of the first layer 110, the design of the first microstructure pattern 115 is formed. For the first microstructure pattern 115 being a grating, a protrusion (or "peak") of the first microstructure pattern 115 would entail the first planar mold 215 having a depression (or "valley") at a corresponding location on the first planar mold 215. Similarly, a depression of the first microstructure pattern 115 would entail the first planar mold 215 having a protrusion at the corresponding location on the first planar mold 215. The film of the first layer 110 can be stopped, stamped by the first planar mold 215, and subsequently moved again a predetermined distance. The film of the first layer 110 can be optionally pre-heated before arriving at the first planar mold 215 in order to increase the temperature of the first material above the $T_g$ of the first material. During stamping, the film of the first layer 110 can be heated, for example, via an underlying support substrate. The first planar mold 215 can also be heated, for example, via a substrate of a pressing device. The pressing device can apply a pressure to the first planar mold 215 to force the first planar mold 215 into the surface of the film of the first layer 110. Again, by heating the first material above the $T_g$ of the first material, the first material can become viscous and amorphous and flow into the features of the first planar mold 215 in order to form the peaks and valleys of the first microstructure pattern 115. After the first layer 110 is imprinted, the imprinted first layer 110 can be cooled to below the $T_g$ of the first material to solidify the first microstructure pattern 115. The second layer 120 can be applied on top of the first layer 110 in order to fill in-between voids of the first microstructure pattern 115. The third layer 125 can subsequently be applied on top of the second layer 120 to encapsulate the first microstructure pattern 115 between the first layer 110 and the third layer 125.

Figure 2C:
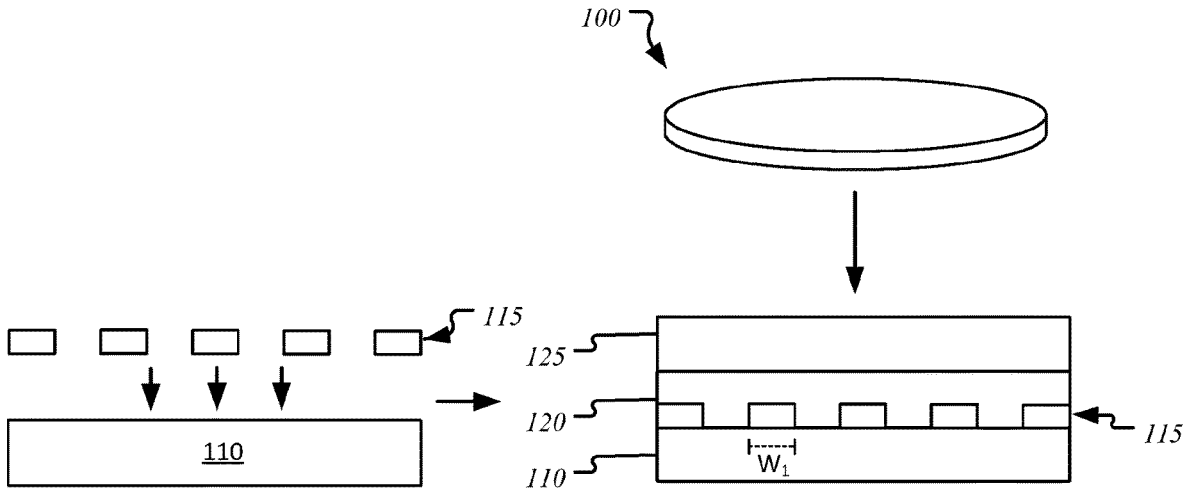
FIG. 2C is a schematic of a pattern transfer fabrication process, according to an embodiment of the present disclosure.

FIG. 2C is a schematic of a pattern transfer fabrication process, according to an embodiment of the present disclosure. In an embodiment, the first microstructure pattern 115 can be formed separately from the first layer 110. Thus, the first microstructure material need not be the same as the first material unless desired. The first microstructure pattern 115 can be formed on a temporary substrate and subsequently deposited or attached to the surface of the first layer 110. In one example, the first microstructure pattern 115 can be formed on the temporary substrate via molding or on a siliconized release film such as polyethylene terephthalate (PET) via a laminating coating process. The first microstructure pattern 115 can be a grating and a series of parallel strips of rectangular lines can be molded onto the temporary substrate. The molded first microstructure pattern 115 can be configured to detach from a surface of the temporary substrate. Subsequently, a first side of the first microstructure pattern 115 opposite the surface of the temporary substrate can be functionalized or activated. For example, the first microstructure material can be polydimethyl siloxane (PDMS) and the first side can be functionalized via a UV-ozone treatment. Similarly, for the first material of the first layer 110 also being PDMS, the surface of the first layer 110 can also be functionalized via the UV-ozone treatment. After, the surface of the first layer 110 and the first side of the first microstructure pattern 115 can be brought into contact such that the surfaces of both the first microstructure pattern 115 and the first layer 110 that were exposed to the UV-ozone treatment come into contact and form a permanent bond. The first microstructure pattern 115 can then be released from the temporary substrate and encapsulating the first microstructure pattern 115 can proceed as previously described. In another example, the first microstructure pattern 115 can be detached from the temporary substrate and laminated or deposited onto the first layer 110 and bonded via an adhesive. This can allow flexibility in the type of material for the first microstructure material if additional fine tuning of the refractive indices of the different materials is desired.

Figure 2D:
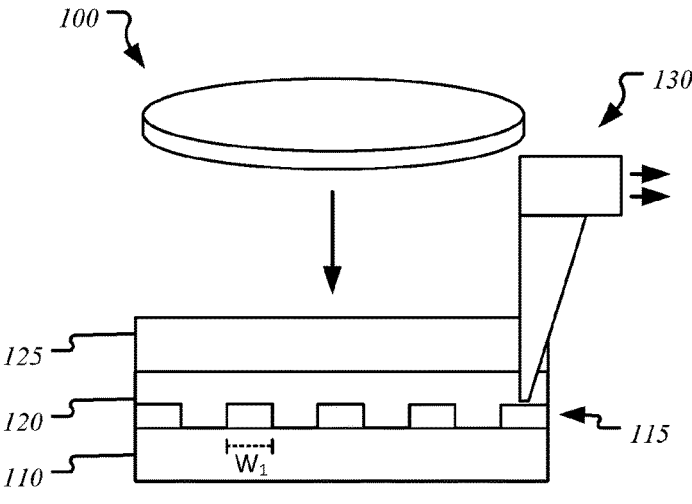
FIG. 2D is a schematic of an additive manufacturing fabrication process, according to an embodiment of the present disclosure.

FIG. 2D is a schematic of an additive manufacturing fabrication process, according to an embodiment of the present disclosure. This can also be referred to as a three-dimensional (3D) printing fabrication process. In one example, the first microstructure pattern 115 can be 3D printed onto the surface of the first layer 110. A number of different materials and 3D printing methods can be used. In one method, fused deposition modeling can be used to deposit a plastic or metal wire filament via a heated nozzle 130 configured to melt the plastic or metal being extruded through onto the first layer 110. For the first microstructure pattern 115 being a grating, the nozzle 130 can pass across the surface of the first layer 110 and print raised rows of features having a rectangular cross-section. In another method, such as digital light processing, the first microstructure material can be curable using a predetermined wavelength of light and deposited on the surface of the first layer 110. Subsequently, the nozzle 130 can be configured to emit the predetermined wavelength of light to cure the first microstructure material. For each layer, the nozzle 130 traces a cross-section of the part pattern on the surface of the first layer coating in the curable first microstructure material. Exposure to the predetermined wavelength of light cures and solidifies the pattern traced on the curable material and joins it to the layer below. After the pattern has been traced, a support supporting the first layer 110 descends by a distance equal to the thickness of a single layer and the first microstructure material is re-coated with fresh material to allow another pass of the nozzle 130 to further build the first microstructure pattern 115. While two example methods have been described, additional 3D printing methods may be contemplated for achieving formation of the first microstructure pattern 115, such as continuous liquid interface production, material jetting, binder jetting, fused filament fabrication, direct metal laser sintering, etc.

Figure 2E:
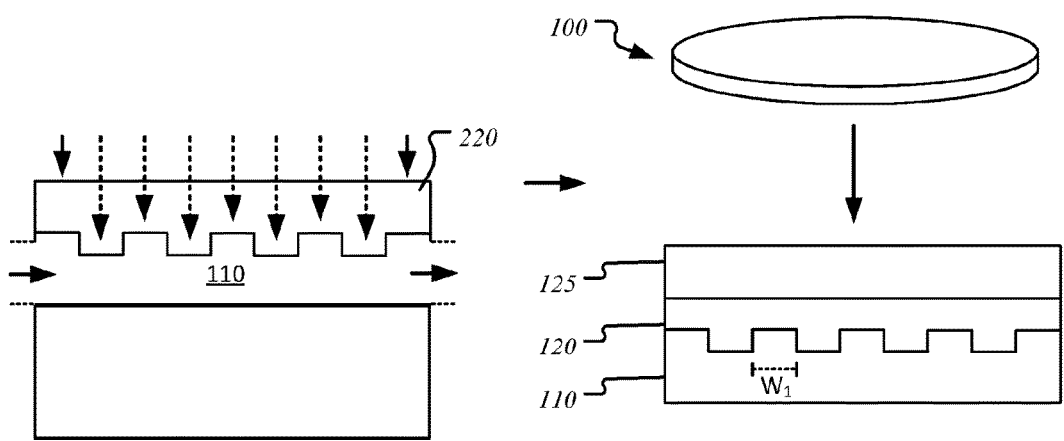
FIG. 2E is a schematic of a UV-assisted roll-to-plate fabrication process, according to an embodiment of the present disclosure.

FIG. 2E is a schematic of a UV-assisted roll-to-plate fabrication process, according to an embodiment of the present disclosure. Similar to the method of FIG. 2B, the film of the first layer 110 can be transported along a production line and a second planar mold 220 can imprint into the first surface of the first layer 110. In one example, the second planar mold 220 can include a negative impression of the first microstructure pattern 115 such that when the first planar mold 215 is imprinted into the first surface of the first layer 110, the design of the first microstructure pattern 115 is formed. Furthermore, the second planar mold 220 can be partially or entirely UV-transparent, such that UV wavelengths of light may travel through the second planar mold 220. Instead of heating the first material of the first layer 110 above the $T_g$ of the first material, the first material can be amorphous and UV-curable. Upon imprinting the second planar mold 220 into the first material, the first material can adopt the shape of the second planar mold 220 and UV light may be directed through the second planar mold 220 to cure the first material for a predetermined curing time while retaining the shape of the first microstructure pattern 115. When the second planar mold 220 is released from the first layer 110, the cured first microstructure pattern 115 remains.

Figure 2F:
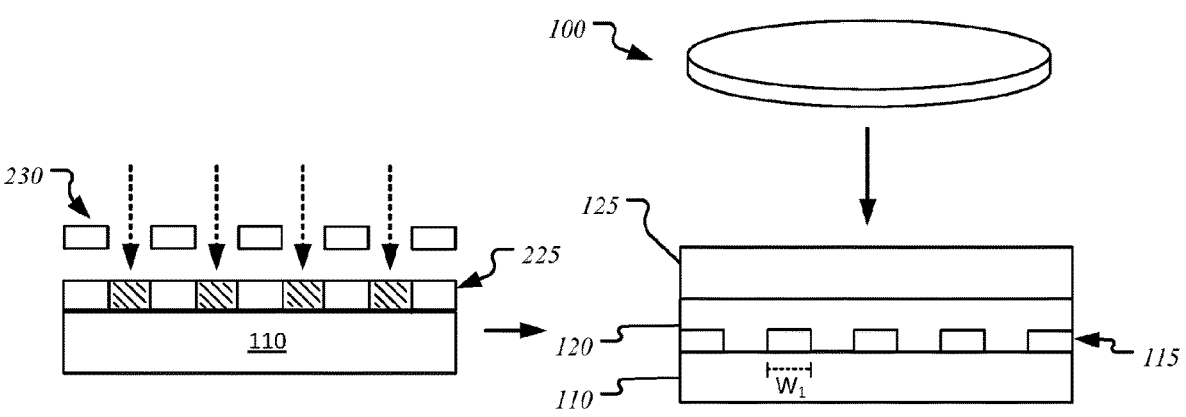
FIG. 2F is a schematic of a photolithography-based fabrication process, according to an embodiment of the present disclosure.

FIG. 2F is a schematic of a photolithography-based fabrication process, according to an embodiment of the present disclosure. In an embodiment, the first microstructure material is a photo-sensitive material and a layer is deposited on the surface of the first layer 110. For example, the first microstructure material can be a negative photoresist. Subsequently, a shadow mask 230 can be arranged above the deposited first microstructure material. The shadow mask 230 can be configured to block a predetermined wavelength of light. For the first microstructure material being the negative photoresist, the shadow mask 230 can be configured to block UV light. The shadow mask 230 can include a shadow pattern that outlines the first microstructure pattern 115. When the first layer 110 with the deposited first microstructure material is exposed to the UV light through the shadow mask 230, the UV light can solubilize the negative photoresist. Thus, upon developing of the negative photoresist after exposure, the solubilized negative photoresist can be washed away, leaving the first microstructure pattern 115 in photoresist. If it is desired that the first microstructure pattern 115 be formed as part of the first layer 110, an etch process can be executed to etch into the surface of the first layer 110. For example, an anisotropic etch can be executed via a reactive ion etch to form the grating with the rectangular cross-section into the surface of the first layer 110. Otherwise, the structures formed from the photoresist themselves can serve as the first microstructure pattern 115.

Figure 3A:
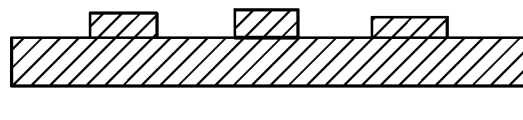
FIG. 3A is a rectangular cross-sectional example for a first microstructure pattern, according to an embodiment of the present disclosure.
Figure 3B:
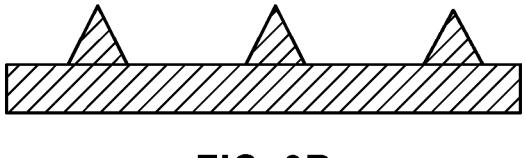
FIG. 3B is a triangular cross-sectional example for a first microstructure pattern, according to an embodiment of the present disclosure.
Figure 3C:
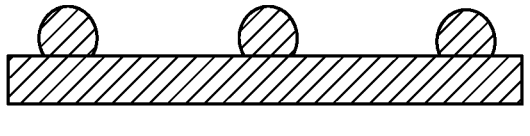
FIG. 3C is a rounded cross-sectional example for a first microstructure pattern, according to an embodiment of the present disclosure.
Figure 3D:
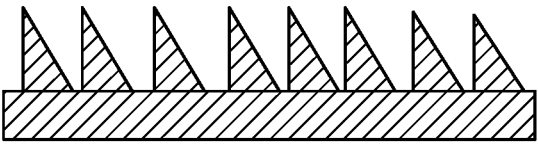
FIG. 3D is an asymmetric triangular cross-sectional example for a first microstructure pattern, according to an embodiment of the present disclosure.

FIGS. 3A-3E are schematics showing additional general examples of microstructure gratings with different shapes and periodicities, according to an embodiment of the present disclosure. FIG. 3A is a rectangular cross-sectional example for the first microstructure pattern 115, according to an embodiment of the present disclosure. FIG. 3B is a triangular cross-sectional example for the first microstructure pattern 115, according to an embodiment of the present disclosure. FIG. 3C is a rounded cross-sectional example for the first microstructure pattern 115, according to an embodiment of the present disclosure. FIG. 3D is an asymmetric triangular cross-sectional example for the first microstructure pattern 115, according to an embodiment of the present disclosure.

Figure 4:
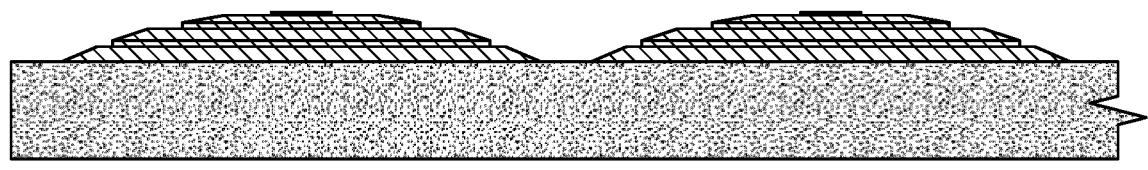
FIG. 4 is a cross-sectional schematic of a rounded concentric ring microstructure formed on top of a first layer, according to an embodiment of the present disclosure.

FIG. 4 is a cross-sectional schematic of a rounded concentric ring microstructure formed on top of the first layer 110, according to an embodiment of the present disclosure. The size, shape, and magnitude of the first microstructure pattern 115 can take on many forms and values. The height of the structure can be between, for example, 1 μm to 10 μm, whereas the gap between each structure can be between, for example, 0 mm to 1 mm. The width of the structure can be between, for example, 20 μm to 2,000 μm, or preferably, 100 μm to 1,200 μm.

Figure 5:
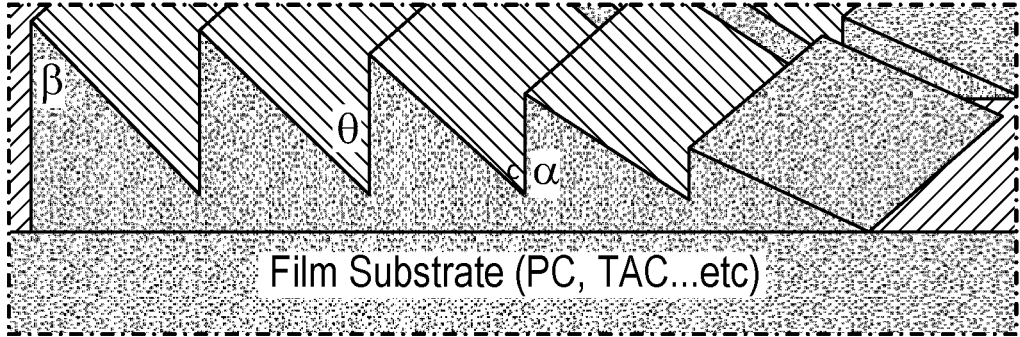
FIG. 5 is a schematic of an example sloped shape for a first microstructure pattern, according to an embodiment of the present disclosure.
Figure 6:
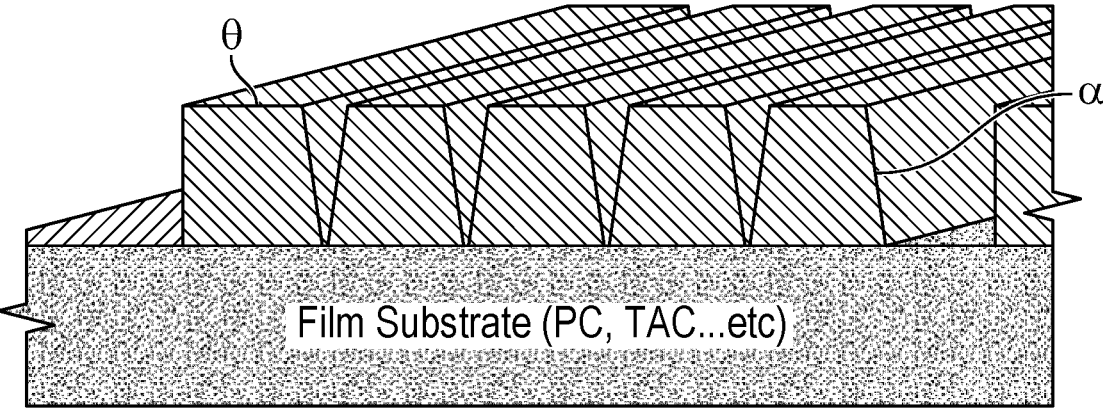
FIG. 6 is a schematic of an example trapezoidal shape for a first microstructure pattern, according to an embodiment of the present disclosure.

FIG. 5 is a schematic of an example sloped shape for the first microstructure pattern 115, according to an embodiment of the present disclosure. FIG. 6 is a schematic of an example trapezoidal shape for the first microstructure pattern 115, according to an embodiment of the present disclosure. The shape and size of the two structures can be determined by the values of the defined variables and angles within their respective figures. For instance, the angles β& θ have a significant impact on how light attenuation on the surface of the flat or thermoformed laminate structures 100, 105 is carried out. Alpha (a) in the case of FIG. 5 can control the width of the base of the triangular structure, whereas in FIG. 6, it can control the degree of rotation of the height of the trapezoid. Theta (θ) in FIG. 6 can change the radius of curvature of the top of the trapezoidal shape. Described herein are further explanations which elaborate on how the functionality of the first microstructure pattern 115 can change based on the different variables.

In one example, the angles β & θ can be 30° respectively, while a can be 1.0 microns in length (1,000 groves/mm). The relationship between the specified variable values mentioned may produce blocking/attenuating/reflection/diffraction at a narrow set of wavelengths, for example a 495-505 nm notch, which, in this example, targets the end of the blue spectrum and beginning of the light green regime.

Figure 7:
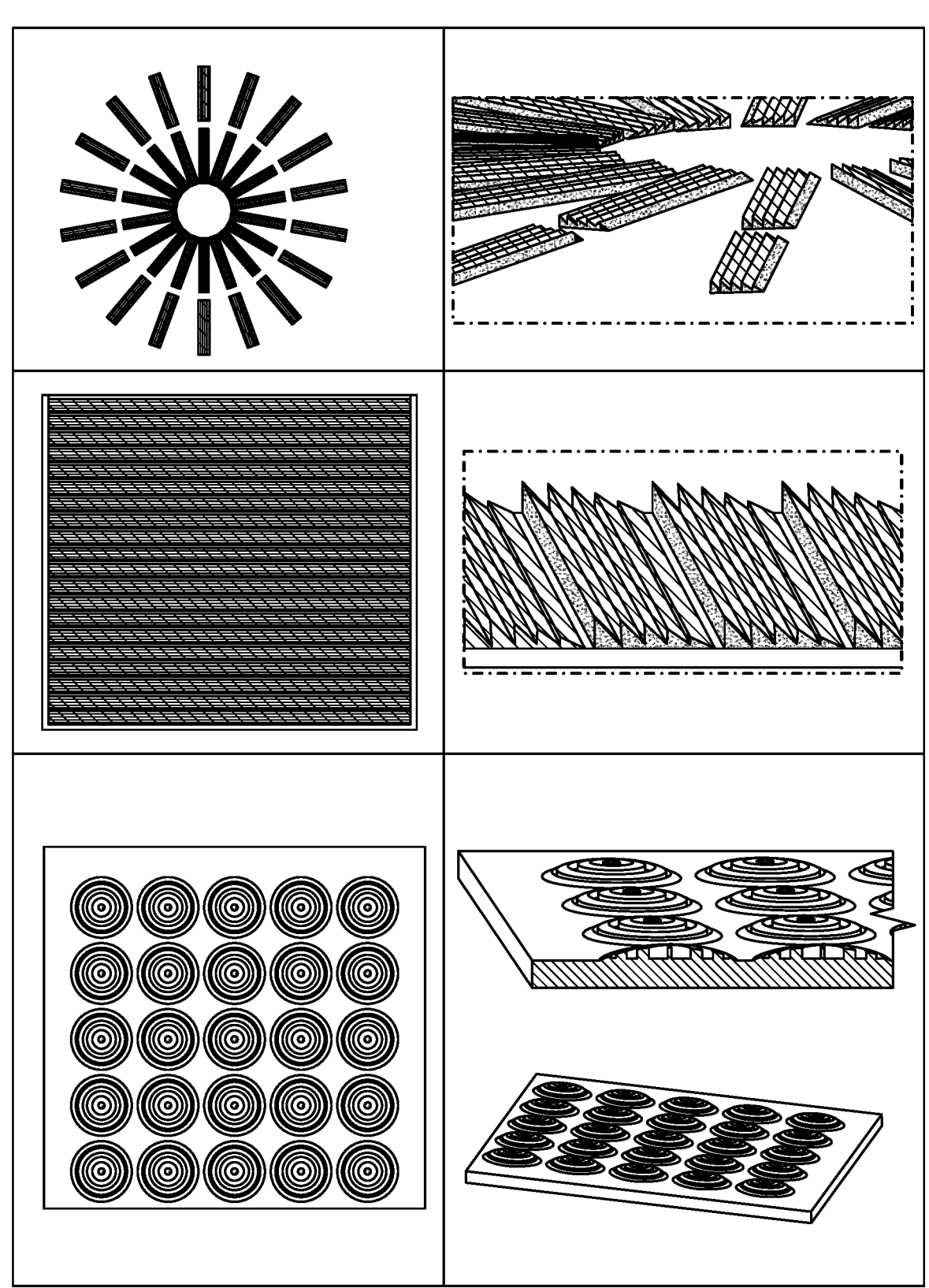
FIG. 7 is a schematic of example microstructures arranged on a first layer, according to an embodiment of the present disclosure.

FIG. 7 is a schematic of example microstructures arranged on the first layer 110, according to an embodiment of the present disclosure.

In one example, changing the value of β can adjust the spectral notch behavior to either the left or right of the electromagnetic spectrum to cut out other wavelengths. FIGS. 5 and 6 show different groups of microstructure gradients. Each group of structured gradients on top of a planar optically transparent film can be designed to have either an isotropic attenuation of light across all gradients (cutting the same wavelengths across the entire film), or a unique and independent set of spectral gradients with respect to the adjacent group of neighboring structures with each set targeting different wavelengths (see FIG. 7, rows 1 and 2). In either case, the values of the aforementioned variables (alpha, beta, theta) can be changed to produce blocking/attenuation/reflection/diffraction at any single or multiple targeted notch wavelength ranges on a single surface of one laminate structure. Multiple microstructures can be stacked atop of each other to target an even greater amount of notch wavelengths. For example, a second microstructure pattern can be formed on top of the first microstructure pattern 115, the second microstructure pattern having a second microstructure material with a second microstructure material refractive index. For example, for a grating, the second microstructure pattern can be disposed over-top the first microstructure pattern 115 such that the grating of the second microstructure pattern aligns orthogonally to the grating of the first microstructure pattern 115. Other alignment angles can be contemplated to adjust the light attenuation effect.

Figure 2G:
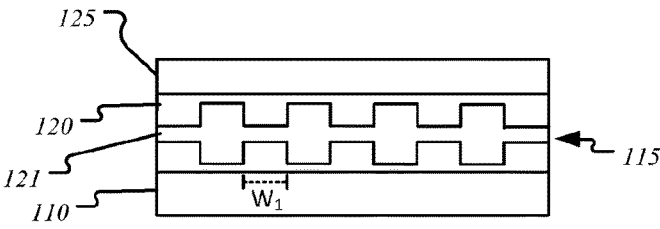
FIG. 2G is a schematic of a double-patterned layer in a flat laminate wafer, according to an embodiment of the present disclosure.

FIG. 2G is a schematic of a double-patterned layer in the flat laminate wafer 100, according to an embodiment of the present disclosure. In one example, the flat laminate wafer 100 can include a microstructure layer 121 disposed between the first layer 110 and the second layer 120. Notably, the microstructure layer 121 can allow for both sides of the microstructure layer 121 to have a microstructure. For example, a first surface of the microstructure layer 121 can include the first microstructure pattern 115 and a second surface of the microstructure layer 121 can include the second microstructure pattern. The values for 13, 0, and a can remain the same or are different for the first surface of the microstructure layer 121 than they are for the second surface of the microstructure layer 121. This can generate a flat laminate structure 100 (or thermoformed laminate structure 105) with 3-ply (or more ply) optically functional materials, in which the middle film has an embossed (via UV/thermal/E-beam/3D-printed, etc.) pattern on both surfaces and the first layer 110 and the third layer 125 are protective layers sandwiching the middle microstructured optically active functional film. The first microstructure pattern 115 can be the same or different than the second microstructure pattern, and the first and second microstructure patterns can be embossed into the first surface and the second surface, respectively. An adhesive or other bonding material 120 can be utilized to bond the microstructure layer 121 to the first layer 110. Alternatively, for example, the first layer 110 with the embossed first microstructure pattern 115 can be bonded to the third layer 125 with the same or different embossed pattern by means of an adhesive or the bonding material 120.

Figure 3E:
FIG. 3E shows a non-repeating pattern for a first microstructure pattern, according to an embodiment of the present disclosure.

FIG. 3E shows a non-repeating pattern for the first microstructure pattern 115, according to an embodiment of the present disclosure. As previously described, a set of similar gratings can be grouped together to create a notched wavelength and multiple sets of the same or different gratings can be grouped to create multiple notched wavelengths. Additionally, in one embodiment, a series of different microstructured dispersive gratings can be formed on the first surface of the first layer 110 or the microstructure layer 121 that can target multiple narrow notch wavelengths via a pattern with different overlapping periods, angles, sizes, and magnitudes to produce narrow notch filters at desirable multiple wavelengths, band widths, band intensities.

In one example, dyes may also be used in combination with the first microstructure pattern 115 as broader filters. For example, the dyes can cut blue light in anti-fatigue eyeglasses, or UV rays in sunglasses, and the notch filters can be employed concurrently in the same filter to selectively decrease select single or multiple wavelength ranges to further enhance the effect of blocked light.

In one example, organic dyes can absorb light over a broad wavelength but while not blocking light in one or more narrow wavelengths gaps. An organic dye can be used to absorb a broad wavelength of light from the ultraviolet into the blue wavelength region (e.g., 400-500 nm) but it cannot skip over (not absorb) select narrow wavelength bands. For example, a different organic dye may be used to absorb light from in the ultraviolet region (<254 nm to 400 nm wavelengths) and several notch grating filters (i.e. the first microstructure pattern 115, the second microstructure pattern, etc.) can remove 420-440 nm and 480-520 nm wavelengths. This would allow visible light to be transmitted (pass through the filter) at the following band pass wavelengths: 400-420 nm, 440-480 nm, and 520-740 nm. These narrow band pass wavelengths would not be available with just organic dyes. Other narrow notch filter wavelengths (band wavelengths and widths, reflection efficiency, etc.) are possible by changing the design of the first microstructure pattern 115.

Figure 8:
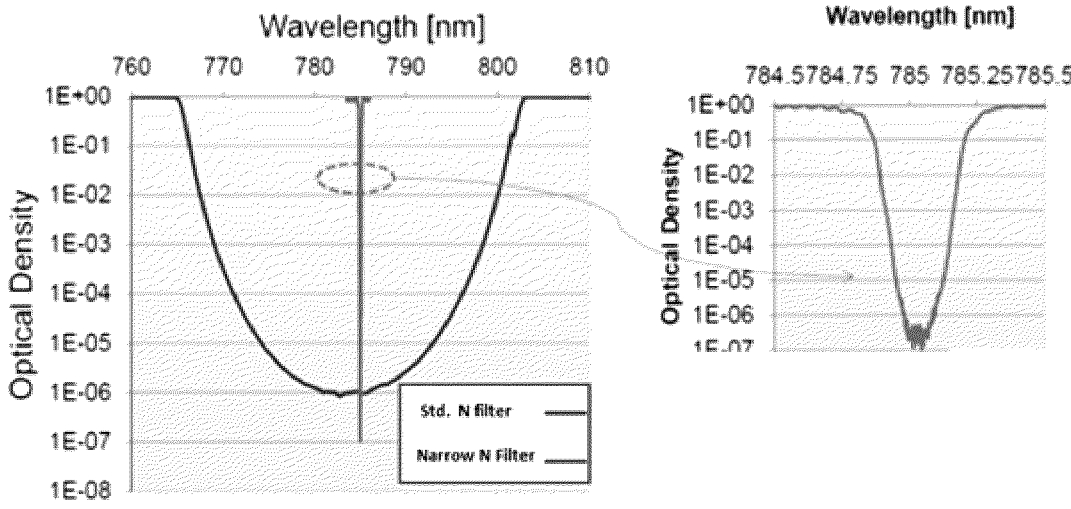
FIG. 8 shows a representative graph illustrating selective attenuation via a first microstructure grating, according to an embodiment of the present disclosure.

FIG. 8 shows a representative graph illustrating selective attenuation via the first microstructure grating 115, according to an embodiment of the present disclosure. The graph shows the attenuation of specific and extremely narrow wavelengths of light, towards the end of the visible spectrum and the beginning of the near infrared (NIR) spectrum. In this example, two spectral curves are shown exhibiting filtering (notching) behavior around the 750-810 nm region. It can be seen that the standard filter has cut ~30-40 nm of the spectral curve, which may or may not have an impact on the optimum visual acuity of a person wearing the eyewear. The laminate structures described herein allow for the rejection or absorption of a very narrow wavelength band (~5-10 nm) within the broader standard filter to enhance or further suppress a desired functionality. Furthermore, there is application in addressing the prevalent issue of photophobia by narrowly and selectively attenuating some wavelengths within the visible spectrum which have been deemed physiologically harmful to the human eye. It is understood that extreme light sensitivity can cause severe migraines and may play a part in exacerbating the severity of vertigo. One of the key issues mitigated via the laminate structures is the reduction of gross photophobia through the use of the first microstructure pattern 115 (or additional microstructure patterns) in the laminate structures that are applied to lenses by selectively removing undesirable light wavelengths while allowing as much of the desired or neutral wavelengths to reach the eye.

Figure 9:
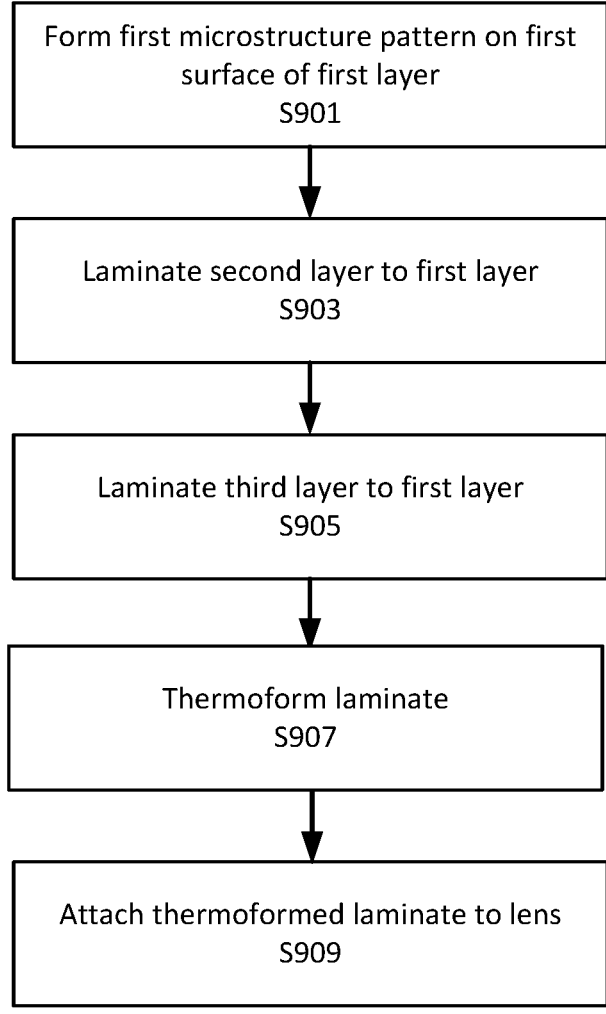
FIG. 9 is a flow chart for a method of fabricating a laminate, according to an embodiment of the present disclosure.

FIG. 9 is a flow chart for a method of fabricating a laminate, according to an embodiment of the present disclosure. In step S901, the first microstructure pattern 115 is formed on the first surface of the first layer 110. For example, the first microstructure pattern 115 is formed directly in the first surface of the first layer 110 via roll-to-roll imprinting, thermally-assisted roll-to-stamp imprinting, or UV-assisted roll-to-stamp imprinting, among others. For example, the first microstructure pattern 115 is formed separately and deposited or adhered to the first surface of the first layer 110. For example, the first microstructure pattern 115 is formed via 3D-printing or photolithography. In step S903, the second layer 120 is laminated to the first layer 110. For example, the second layer 120 is an adhesive film. In step S905, the third layer 125 is laminated to the second layer 120 to form the flat laminate wafer 100. In step S907, the flat laminate wafer 100 is thermoformed into the thermoformed laminate wafer 105 via a thermoforming device. For example, a LEMA of Italy device is used. In step S909, the thermoformed laminate wafer 105 is attached to the lens. For example, the thermoformed laminate wafer 105 can be over-molded in the molding device, wherein the polymer melt 140 is injected adjacent to the concave first layer 110 and molded into the lens with the thermoformed laminate wafer 105. In another example, an adhesive is used to bond the (concave first layer 110 of the) thermoformed laminate wafer 105 to the convex surface of the semi-finished lens. In another example, the thermoformed laminate wafer 105 can be over-casted or inserted within a mold casting device, wherein a combination of monomer, cross-linker, and initiators can be fed through the mold casting cavity to cause adhering to the thermoformed laminate wafer 105 and then cured to form the finished lens.

To summarize the attachment methods of the thermoformed laminate wafer 105 to the lens, i) for thermoplastic polycarbonate lenses, the thermoformed laminate wafer 105 can be over-molded on the convex surface of the lens, i.e., polymer melt 140 is injected behind the thermoformed laminate wafer 105; ii) for thermoset cast lenses, the thermoformed laminate wafer 105 can be placed on the surface of the casting mold, or the thermoformed laminate wafer 105 can be offset from the surface of a casting mold by 0.1-1.0 mm. Then the void space is filled with thermoset monomers/resin and allowed to cure. A primer layer can be applied for the film surface to bond to the casting monomers/resin; iii) for front-side lamination or back-side lamination, the thermoformed laminate wafer 105 can be a) permanently adhered/bonded to either the convex (front-side, most preferred) or concave (back-side, secondary preference) of an existing polycarbonate or cast lens, or b) non-permanently fastened as a patch or other temporary fixture to either the convex (front-side, most preferred) or concave (back-side, secondary preference) of an existing polycarbonate or cast lens.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Embodiments of the present disclosure may also be as set forth in the following parentheticals.

(1) A laminate, comprising a first layer, a first material of the first layer having a first refractive index, the first layer including a first surface; a first microstructure layer including a first microstructure pattern formed on a first surface of the microstructure layer, a first microstructure material of the first microstructure layer having a first microstructure material refractive index, the first microstructure pattern having first repeating structures with a first predetermined periodicity, the microstructure layer being disposed on the first surface of the first layer; a second layer, a second material of the second layer having a second refractive index, the second layer being disposed adjacent to the first surface of the first microstructure layer; and a third layer, a third material of the third layer having a third refractive index, the third layer being disposed adjacent to the second layer on a side opposite the microstructure layer.

(2) The laminate of (1), wherein the first microstructure layer is formed into the first surface of the first layer.

(3) The laminate of either (1) or (2), wherein the laminate is formed on a convex surface of a lens, the first layer being disposed adjacent to the convex surface of the lens.

(4) The laminate of (3), wherein the laminate is formed on the convex surface of the lens by one of front-side lamination, overmolding, or via bonding with an adhesive.

(5) The laminate of any one of (1) to (4), wherein the laminate is formed on a concave surface of a lens by back-side lamination, the third layer being disposed adjacent to the concave surface of the lens.

(6) The laminate of any one of (1) to (5), wherein the first microstructure layer includes a second microstructure pattern formed on a second surface of the microstructure layer opposite the first surface having the first microstructure pattern.

(7) The laminate of any one of (1) to (6), wherein the second layer encapsulates the first microstructure pattern and the second material fills in voids between each of the first repeating structures.

(8) The laminate of any one of (1) to (7), wherein the first microstructure pattern is formed via a process selected from the group consisting of thermal-assisted imprinting, UV-assisted imprinting, additive manufacturing, pattern transfer, photolithography, or roll-to-roll mold imprinting.

(9) The laminate of any one of (1) to (8), further comprising: a second microstructure layer, a second microstructure material of the second microstructure layer having a second microstructure material refractive index, a first surface of the second microstructure layer including a second microstructure pattern formed on the first surface of the second microstructure layer, the second microstructure pattern having second repeating structures with a second predetermined periodicity, the second microstructure layer being disposed between the first microstructure layer and the second layer, the first surface of the second microstructure layer being disposed adjacent to the second layer.

(10) The laminate of any one of (1) to (9), wherein the first refractive index is greater than the second refractive index.

(11) A method of forming a laminate, comprising: forming a first microstructure pattern on a first surface of a first layer, the first layer having a first material with a first refractive index, the first microstructure pattern having first repeating structures with a first predetermined periodicity; laminating a second layer to the first layer, the second layer having a second material with a second refractive index, the second layer being disposed adjacent to the first surface of the first layer; and laminating a third layer having a third material with a third refractive index to the second layer.

(12) The method of (11), further comprising: prior to laminating the second layer to the first layer, imprinting the first microstructure pattern into the first surface of the first layer.

(13) The method of (12), the first microstructure is imprinted via a process selected from the group consisting of thermal-assisted imprinting, UV-assisted imprinting, 3D additive manufacturing, or roll-to-stamp mold imprinting.

(14) The method of (11), wherein the forming the first microstructure pattern on the first surface of the first layer further comprises: forming the first microstructure pattern on a first surface of a first microstructure layer, a first microstructure material of the first microstructure layer having a first microstructure material refractive index, the first microstructure pattern having first repeating structures with a first predetermined periodicity; and bonding a second surface of the first microstructure layer to the first surface of the first layer.

(15) The method of (14), wherein the forming the first microstructure pattern on the first surface of the first layer further comprises: forming a second microstructure pattern on the second surface of the first microstructure layer; and bonding the second surface of the first microstructure layer having the second microstructure pattern formed thereon to the first surface of the first layer.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

The invention claimed is:

1. A laminate, comprising:

a first layer, a first material of the first layer having a first refractive index, the first layer including a first surface;

a first microstructure layer including a first microstructure pattern formed on a first surface of the microstructure layer, a first microstructure material of the first microstructure layer having a first microstructure material refractive index, the first microstructure pattern having first repeating structures with a first predetermined periodicity, the first microstructure layer being disposed on the first surface of the first layer;

a second layer, a second material of the second layer having a second refractive index, the second layer being disposed adjacent to the first surface of the first microstructure layer;

a third layer, a third material of the third layer having a third refractive index, the third layer being disposed adjacent to the second layer on a side opposite the microstructure layer; and a second microstructure layer, a second microstructure material of the second microstructure layer having a second microstructure material refractive index, a first surface of the second microstructure layer including a second microstructure pattern formed on the first surface of the second microstructure layer, the second microstructure pattern having second repeating structures with a second predetermined periodicity, the second microstructure layer being disposed between the first microstructure layer and the second layer, the first surface of the second microstructure layer being disposed adjacent to the second layer.

2. The laminate of claim 1, wherein the first microstructure layer is formed into the first surface of the first layer.

3. The laminate of claim 1, wherein the laminate is formed on a convex surface of a lens, the first layer being disposed adjacent to the convex surface of the lens.

4. The laminate of claim 3, wherein the laminate is formed on the convex surface of the lens by one of front-side lamination, overmolding, or via bonding with an adhesive.

5. The laminate of claim 1, wherein the laminate is formed on a concave surface of a lens by back-side lamination, the third layer being disposed adjacent to the concave surface of the lens.

6. The laminate of claim 1, wherein the first microstructure layer includes a second microstructure pattern formed on a second surface of the first microstructure layer opposite the first surface having the first microstructure pattern.

7. The laminate of claim 1, wherein the second layer encapsulates the first microstructure pattern and the second material fills in voids between each of the first repeating structures.

8. The laminate of claim 1, wherein the first microstructure pattern is formed via a process selected from the group consisting of thermal-assisted imprinting, UV-assisted imprinting, additive manufacturing, pattern transfer, photolithography, or roll-to-roll mold imprinting.

9. The laminate of claim 1, wherein the first refractive index is greater than the second refractive index.

10. A method of forming the laminate according to claim 1, comprising:

forming a first microstructure pattern on a first surface of a first layer, the first layer having a first material with a first refractive index, the first microstructure pattern having first repeating structures with a first predetermined periodicity;

laminating a second layer to the first layer, the second layer having a second material with a second refractive index, the second layer being disposed adjacent to the first surface of the first layer;

laminating a third layer having a third material with a third refractive index to the second layer;

forming a second microstructure pattern on the second surface of the first microstructure layer; and bonding the second surface of the first microstructure layer having the second microstructure pattern formed thereon to the first surface of the first layer.

11. The method of claim 10, further comprising:

prior to laminating the second layer to the first layer, imprinting the first microstructure pattern into the first surface of the first layer.

12. The method of claim 11, wherein the first microstructure is imprinted via a process selected from the group consisting of thermal-assisted imprinting, UV-assisted imprinting, 3D additive manufacturing, or roll-to-stamp mold imprinting.

13. The method of claim 10, wherein forming the first microstructure pattern on the first surface of the first layer further comprises:

forming the first microstructure pattern on a first surface of a first microstructure layer, a first microstructure material of the first microstructure layer having a first microstructure material refractive index, the first microstructure pattern having first repeating structures with a first predetermined periodicity; and bonding a second surface of the first microstructure layer to the first surface of the first layer.

* * * * *